(12) United States Patent
Teeple

(10) Patent No.: US 7,261,313 B2
(45) Date of Patent: Aug. 28, 2007

(54) TOWING MECHANISM

(76) Inventor: Robert A. Teeple, 6724 W. U.S. 6, Gibsonburg, OH (US) 43431

( * ) Notice: Subject to any disclaimer, the term of this patent is extended or adjusted under 35 U.S.C. 154(b) by 0 days.

(21) Appl. No.: 11/179,182

(22) Filed: Jul. 12, 2005

(65) Prior Publication Data

US 2006/0012149 A1 Jan. 19, 2006

Related U.S. Application Data

(60) Provisional application No. 60/587,984, filed on Jul. 14, 2004.

(51) Int. Cl.
*B60D 1/00* (2006.01)
*B62D 53/00* (2006.01)

(52) U.S. Cl. .................. 280/476.1; 280/461.1
(58) Field of Classification Search ............ 280/476.1, 280/461.1, 455.1, 456.1, 483, 489, 493
See application file for complete search history.

(56) References Cited

U.S. PATENT DOCUMENTS

| | | | |
|---|---|---|---|
| 2,254,532 A | 9/1941 | Knox | |
| 2,498,779 A | 2/1950 | Winchester | |
| 3,663,039 A | 5/1972 | Morgan | |
| 3,815,939 A | 6/1974 | Pettay | |
| 3,865,405 A | 2/1975 | Mitchell et al. | |
| 5,259,471 A * | 11/1993 | Taylor et al. | 180/12 |
| 5,348,332 A | 9/1994 | Hamilton | |
| 5,382,041 A | 1/1995 | Keith | |
| 5,531,468 A | 7/1996 | White | |
| 5,607,176 A * | 3/1997 | Leib et al. | 280/656 |
| 5,860,670 A | 1/1999 | Aubin | |
| 6,036,217 A | 3/2000 | Burkhart, Sr. et al. | |
| 6,182,997 B1 | 2/2001 | Ullrich et al. | |
| 6,273,447 B1 | 8/2001 | Vande Berg | |
| 6,290,248 B1 | 9/2001 | Yrigoyen | |
| 6,733,028 B2 * | 5/2004 | Teeple | 280/476.1 |
| 2005/0057014 A1 * | 3/2005 | Ramsey | 280/124.116 |

FOREIGN PATENT DOCUMENTS

WO WO 01/70522 A1 * 9/2001

OTHER PUBLICATIONS http://www.hitch-buddy.com/Hitch.htm, Hitch Buddy, Retrieved Aug. 18,2006 (Note: Web site is of that of current assignee/inventor).*

* cited by examiner

*Primary Examiner*—Lesley D. Morris
*Assistant Examiner*—Marc A. Scharich
(74) *Attorney, Agent, or Firm*—Fraser Clemens Martin & Miller LLC; J. Douglas Miller

(57) ABSTRACT

A towing mechanism for a vehicle is disclosed having an axle and wheel assembly, the towing mechanism including at least one of a linkage and a stabilizer to militate against a rocking motion of the towing mechanism and maximize stability.

17 Claims, 6 Drawing Sheets

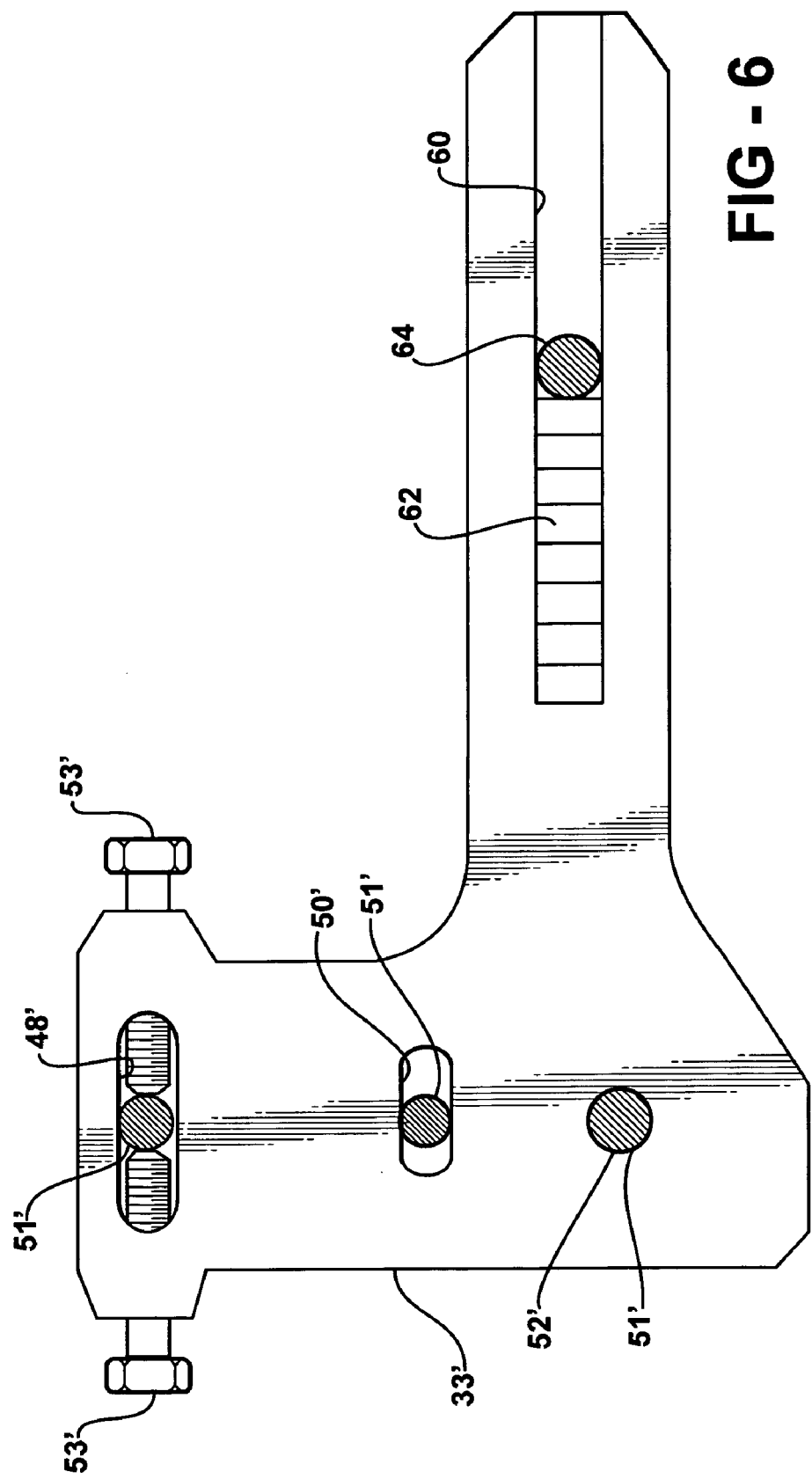

TOWING MECHANISM

CROSS-REFERENCE TO RELATED APPLICATION

This application claims priority to U.S. provisional patent application 60/587,984, filed Jul. 14, 2004, hereby incorporated herein by referenced in its entirety.

FIELD OF THE INVENTION

The invention relates to a towing mechanism and more particularly to a towing mechanism including at least one of a linkage and a stabilizer to militate against a rocking motion of the towing mechanism and maximize stability.

BACKGROUND OF THE INVENTION

A towing mechanism such as a hitch, for example, is frequently added to a vehicle for the purpose of towing a trailer. The trailer adds extra weight to the towing vehicle which is concentrated on the rear axle, suspension, and frame of the towing vehicle. The additional weight of the trailer creates stress concentrations which may result in damage to the towing vehicle. Additionally, handling and braking of the towing vehicle are adversely affected by the added weight of the trailer.

Trailer towing devices, such as disclosed in U.S. Pat. No. 5,860,670, have attempted to address the added weight problem. However, maneuvering, especially when moving in reverse, of a trailer connected to a towing vehicle using the device disclosed in the '670 patent is complicated since the axle of the towing device moves independently of the axle of the towing vehicle.

Commonly owned U.S. Pat. No. 6,733,028 is hereby incorporated herein by reference, in its entirety.

It would be desirable to produce a towing mechanism wherein a stability thereof is maximized.

SUMMARY OF THE INVENTION

Consistent and consonant with the present invention, a towing mechanism wherein a stability thereof is maximized, has surprisingly been discovered.

In one embodiment, the towing mechanism for linking a vehicle and a trailer comprises a main frame having a front portion and a rear portion; a receiver frame, wherein one of the main frame and the receiver frame is adapted for attachment to the trailer and the other of the main frame and the receiver frame is adapted for attachment to the vehicle; a first linkage interconnecting the main frame and the receiver frame to facilitate relative vertical movement and to militate against relative horizontal movement between the main frame and the receiver frame; a second linkage interconnecting the main frame and the receiver frame and offset from the first linkage at least one of vertically and horizontally; ground engaging means disposed on the main frame.

In another embodiment, the towing mechanism for linking a vehicle and a trailer comprises a main frame; a receiver frame, wherein one of the main frame and the receiver frame is adapted for attachment to the trailer and an other of the main frame and the receiver frame is adapted for attachment to the vehicle; a plurality of first linkages interconnecting the main frame and the receiver frame to facilitate relative vertical movement and to militate against relative horizontal movement between the main frame and the receiver frame; ground engaging means disposed on the main frame; and at least one stabilizer disposed between the other of the main frame and the receiver frame and the vehicle.

In another embodiment, the towing mechanism for linking a vehicle and a trailer comprises a main frame having a front portion and a rear portion; a receiver frame, wherein one of the main frame and the receiver frame is adapted for attachment to the trailer and an other of the main frame and the receiver frame is adapted for attachment to the vehicle; a first linkage interconnecting the main frame and the receiver frame to facilitate relative vertical movement and to militate against relative horizontal movement between the main frame and the receiver frame; a second linkage interconnecting the main frame and the receiver frame and offset from the first linkage at least one of vertically and horizontally; an axle disposed on the main frame, the axle adapted to receive ground engaging wheels thereon; and at least one stabilizer disposed between the one of the main frame and the receiver frame and the vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 6 is a side view of a hitch bar according to another embodiment of the invention.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
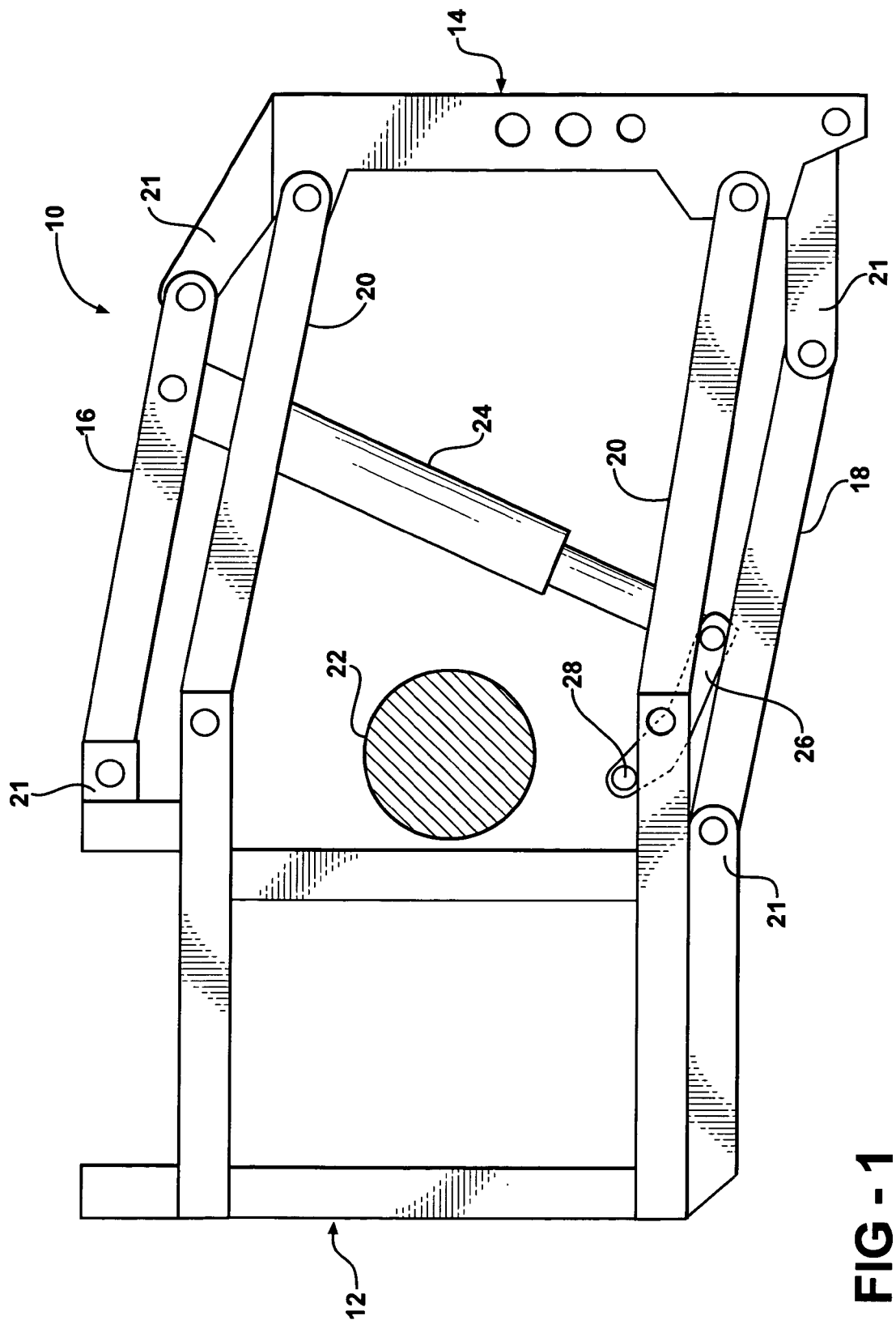
FIG. 1 is a side view partially in section of a towing mechanism according to an embodiment of the invention.

FIG. 1 depicts a towing mechanism 10 according to an embodiment of the invention. The towing mechanism 10 includes a main frame 12 and a receiver frame 14. The main frame 12 is adapted to support the load of a trailer (not shown) being towed. The receiver frame 14 is adapted to be connected to a tow vehicle (not shown).

Linkages 16, 18, 20 are pivotally disposed between the main frame 12 and the receiver frame 14 to allow relative movement therebetween. The linkages 16, 18 are offset rearwardly in respect of the receiver frame 14 from the linkages 20 and vertically from the linkages 20 to provide extra support and militate against a rocking motion of the main frame 12. The linkages 16, 18, 20 are typically the same length, but linkages 16, 18, 20 having different lengths can be used as desired. Mounting brackets 21 provide pivotal mounting connections for the linkages 16, 18, 20.

An axle 22 is disposed on the main frame 12. Any conventional axle can be used including a rubber suspension axle such as manufactured under the registered trademark Torflex, an air ride axle, a leaf spring axle, a coil spring axle, a steering axle, or a drive axle with a power source (not shown) to help drive the tow vehicle, for example. Controls for the power source for the drive axle can be coupled from the tow vehicle to the towing mechanism 10 using quick disconnects which permit an operator of the vehicle to use different motorized towing mechanisms 10 for different load requirements. The drive axle allows the towing mechanism 10 to adapt to various vehicle types and can be used as a primary or a secondary drive. Power steering, a vacuum system, fuel delivery and storage systems, and other devices can also be provided as needed. By using different size power sources, drives, and suspensions, the operator is able to select a desired towing capacity and load requirement necessary to tow a specific trailer or load. It is understood that multiple axles 22 can also be disposed on the main frame 12 as desired.

If the steering axle is used, limited steering is provided and the steering is activated by the turning action of the tow vehicle. When the tow vehicle turns, the spindles of the steering axle are caused to pivot resulting in the wheels and tires following the motion of the tow vehicle. Thus tire wear and lateral forces between the tow vehicle and the towing mechanism 10 caused from the different turning radiuses of the axle 22 and an axle of the tow vehicle are minimized.

At least one shock absorber 24 is disposed between the main frame 12 and the receiver frame 14. The shock absorber 24 can be any conventional shock absorber such as an adjustable air shock absorber, a coil spring shock absorber, an air bag, or an adjustable load bearing shock absorber, for example. In the embodiment shown, the shock absorber 24 is disposed between the linkage 16 and the main frame 12. However, it is understood that the shock absorber 24 can be disposed between the linkage 18, 20 and the main frame 12, the linkage 16, 18, the linkages 20, the linkages 16, 20, the linkages 18, 20, or directly between the main frame 12 and the receiver frame 14, as desired. Additionally, the shock absorber 24 can be disposed between a fifth wheel hitch frame (not shown) supported by the main frame 12 and the receiver frame 14. Mounting holes can be provided on the linkages 16, 18, 20 for the shock absorber 24 as needed.

In the position shown in FIG. 1, the shock absorber 24 minimizes a tongue weight transferred to the tow vehicle to cause the towing mechanism 10 to share the load of the trailer. Alternatively, the shock absorber can be installed in a position where a top portion of the shock absorber 24 is more distant from the tow vehicle than a bottom portion of the shock absorber 24. When in the alternate position, the shock absorber 24 transfers trailer tongue weight to the tow vehicle for increased drive traction for the tow vehicle. The shock absorber 24 also acts as a dampener to slow and soften relative movement between the towing mechanism 10 and the tow vehicle.

Figure 3:
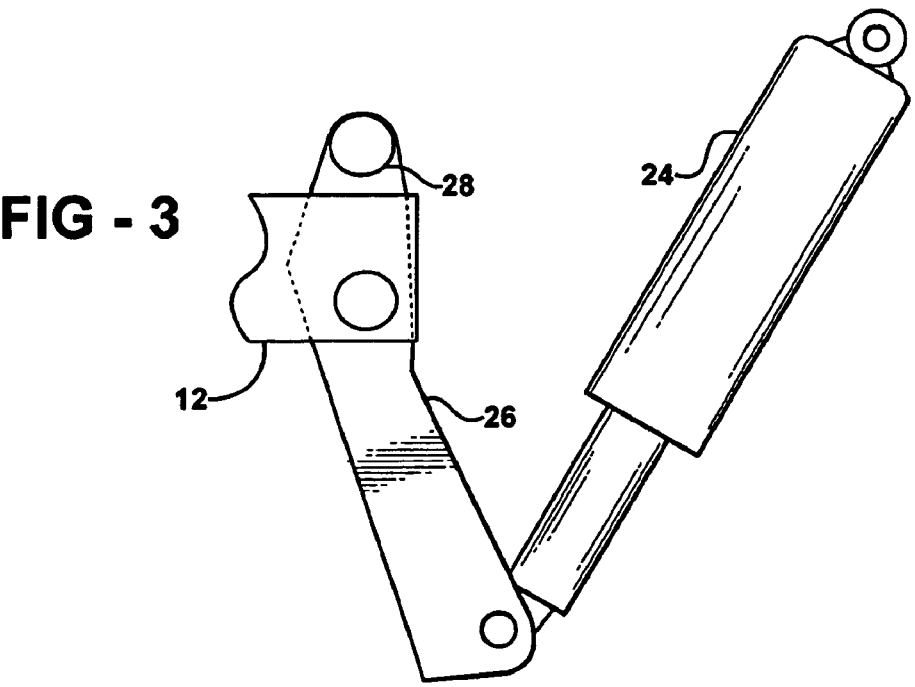
FIG. 3 is a partial side view of the towing mechanism of FIG. 1 showing a shock absorber disposed between a first linkage and a second linkage.

One end of a shock mount 26 is pivotally connected to one end of the shock absorber 24, as illustrated in FIG. 3. The other end of the shock mount 26 is pivotally connected to the main frame 12. The shock mount facilitates an increase in the distance the towing mechanism 10 can travel up and down, independent of the tow vehicle. Once the shock absorber 24 is fully extended, the shock mount 26 pivots and provides the shock absorber 24 with extra extension motion.

Extension of the shock absorber is controlled by a stop 28, which prevents the shock mount 26 from rotating beyond a predetermined point. Rotation beyond the predetermined point would align the shock mount 26 with the axis of the shock absorber 24, causing the shock mount 26 to lock. Additional shock absorbers (not shown) can be disposed between the axle 22 and the main frame 12 to dampen the action of the main frame 12 caused by the weight of the trailer being applied to the axle 22.

Figure 2:
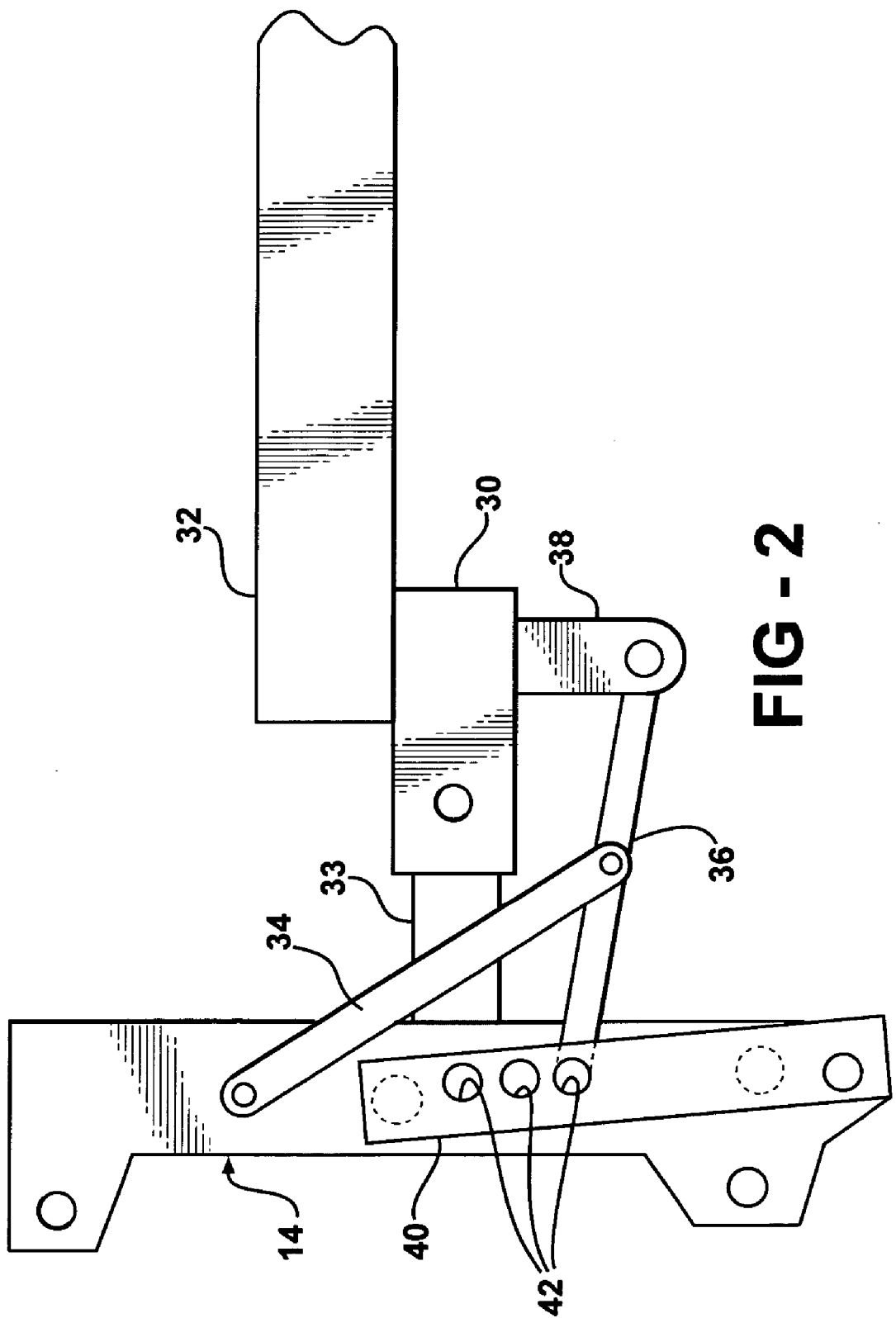
FIG. 2 is a partial side view of the towing mechanism of FIG. 1 showing a receiver frame connected to a vehicle frame.

FIG. 2 shows the receiver frame 14 connected to a hitch receiver 30 depending from a frame member 32 of the tow vehicle. A hitch bar 33 connected to the receiver frame 14 is disposed in the hitch receiver 30. A first stabilizer 34 and a second stabilizer 36 are pivotally disposed between the receiver frame 14 and the hitch receiver 30 to militate against a twisting motion of the towing mechanism 10 relative to the tow vehicle and militate against the rocking motion of the main frame 12 due to the weight of the trailer being towed. One end of the first stabilizer 34 is pivotally connected to the receiver frame 14 and the other end of the first stabilizer 34 is pivotally connected to the second stabilizer 36, thus restricting pivotal motion of the second stabilizer 36. The second stabilizer 36 is pivotally connected between the receiver frame 14 and a stabilizer mount 38 depending from the hitch receiver 30. In the embodiment shown, the first stabilizer 34 and the second stabilizer 36 are produced from spring steel, although any conventional materials can be used such as carbon steel, for example.

A plate 40 having stabilizer bar mounting holes 42 formed therein is disposed on the receiver frame 14. The steel plate 40 is connected to the receiver frame 14 in a fixed position with sufficient clearance to facilitate connection of at least one of the first stabilizer 34 and the second stabilizer 36.

A caster assembly (not shown) can be connected to, and extend forward from, the rear bottom portion of the main frame 12, to balance the towing mechanism 10 and aid in moving the towing mechanism 10 when not connected to the tow vehicle. The caster assembly typically includes pivotal wheels and a means to raise and lower the hitch bar 33 of the towing mechanism 10. Attachments (not shown) such as a hitch-lift to raise and lower a trailer tongue and other lifting devices can be added to the main frame 12 using mounting holes formed in the towing mechanism 10.

Figure 4:
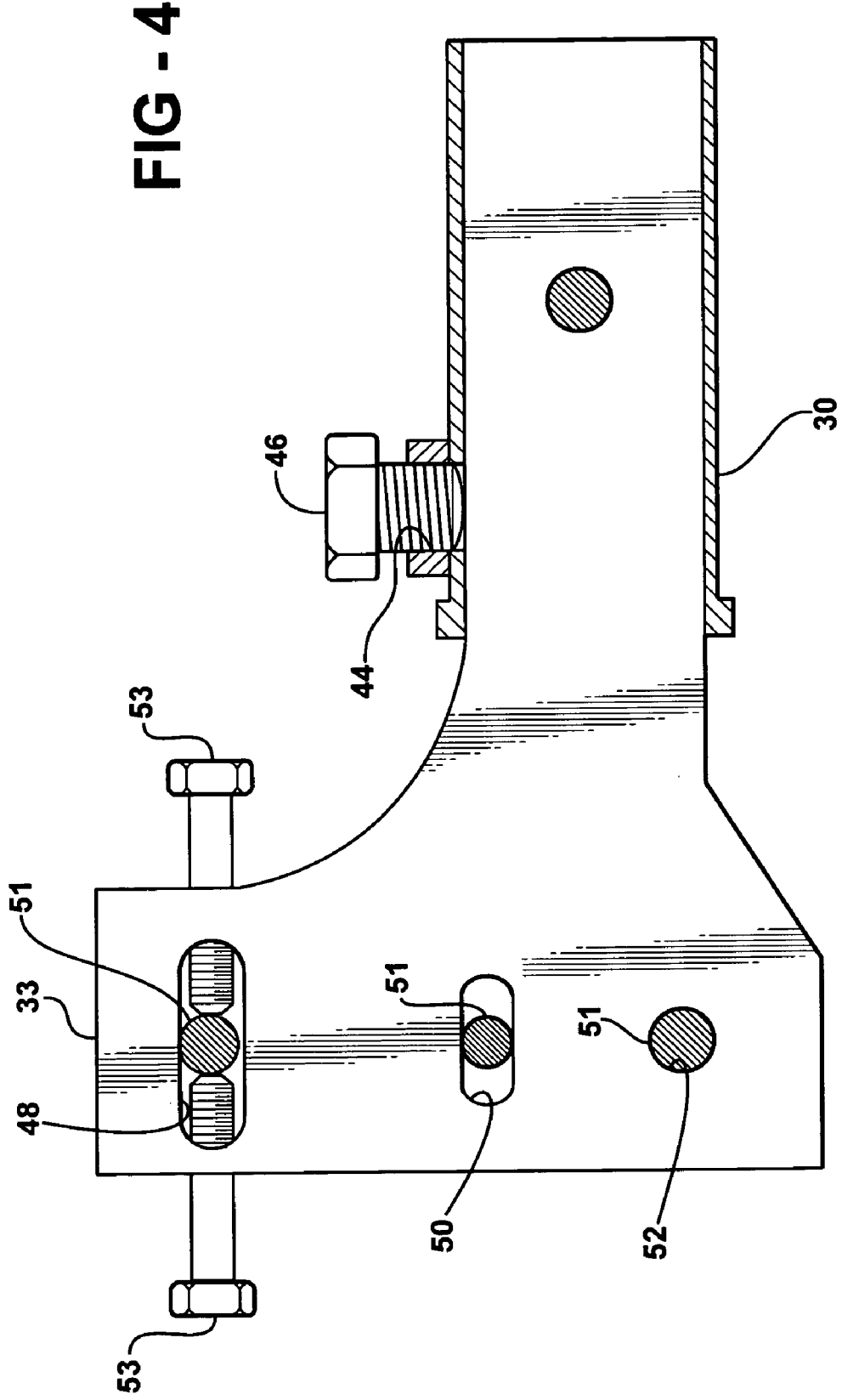
FIG. 4 is a partial side view of the towing mechanism of FIG. 1 showing a clearance adjusting mechanism disposed on the receiver tube.

FIG. 4 shows the hitch bar 33 disposed in the hitch receiver 30. In the embodiment shown, a threaded aperture 44 is formed in the hitch receiver 30 and is adapted to receive a threaded fastener 46 therein. The fastener 46 can be tightened against the hitch bar 33 to securely hold the hitch bar 33 in the hitch receiver 30.

The hitch bar 30 includes a first adjustment hole 48, a second adjustment hole 50, and a third adjustment hole 52 formed therein. The adjustment holes 48, 50, 52 are used to level the main frame 12 of the towing mechanism 10 from front to rear. The first adjustment hole 48 and the second adjustment hole 50 have an elongate shape. The third mounting hole has a circular shape. Mounting bolts 51 are received in the adjustment holes 48, 50, 52 to connect to the hitch bar 33 to the receiver frame 14. Adjusting screws 53 abut the mounting bolt 51 of the first adjustment hole 48. When the adjusting screws are operated the receiver frame 14 is caused to pivot about the third adjustment hole 52, thus causing the main frame 12 to rock forward or rearward. This adjustment is used to level or pre-load the main frame 12 of the towing mechanism 10 for use. The first adjustment hole 48 can include a sleeve (not shown) that slides over the mounting bolt to protect the bolt from the extreme pressure exerted by the adjusting screws.

Figure 5:
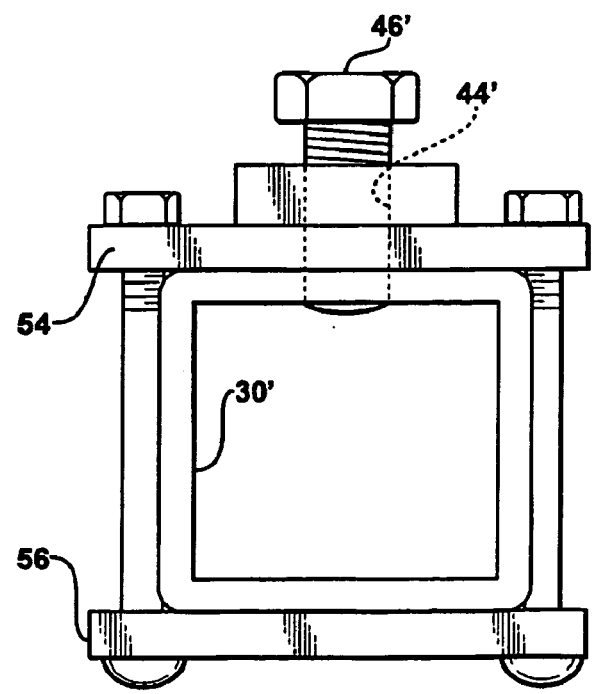
FIG. 5 is an end view of a receiver tube according to another embodiment of the invention.

In FIG. 5, an alternate embodiment of the structure of FIG. 4 is shown. Like structure from FIG. 4 has the same reference numerals with a prime ' symbol. Unless otherwise described, the use and operation of the structure is the same as previously described. An upper bracket 54 and a lower bracket 56 are respectively disposed on an upper portion of the hitch receiver 30'. A threaded aperture 44' is formed in the upper bracket 54 and is adapted to receive a threaded fastener 46' therein. The fastener 46' extends through an aperture formed in the hitch receiver 30. Operation of the fastener 46' is the same as previously described for the fastener 46.

FIG. 6 illustrates an alternate embodiment of a hitch bar 33'. Like structure from FIG. 4 has the same reference numerals with a prime ' symbol. Unless otherwise described, the use and operation of the structure is the same as previously described. The hitch bar 33' includes a slot 60 formed therein. A driven member 62 is disposed in the slot 60. The driven member 62 can be any conventional driven member such as a chain, a rack, a notched member, or other driven member, for example. The driven device is adapted to abut a hitch pin 64 and is operated by a ratcheting device (not shown) to cause the hitch bar 33' to be driven into or from the receiver tube of the tow vehicle.

Figure 7:
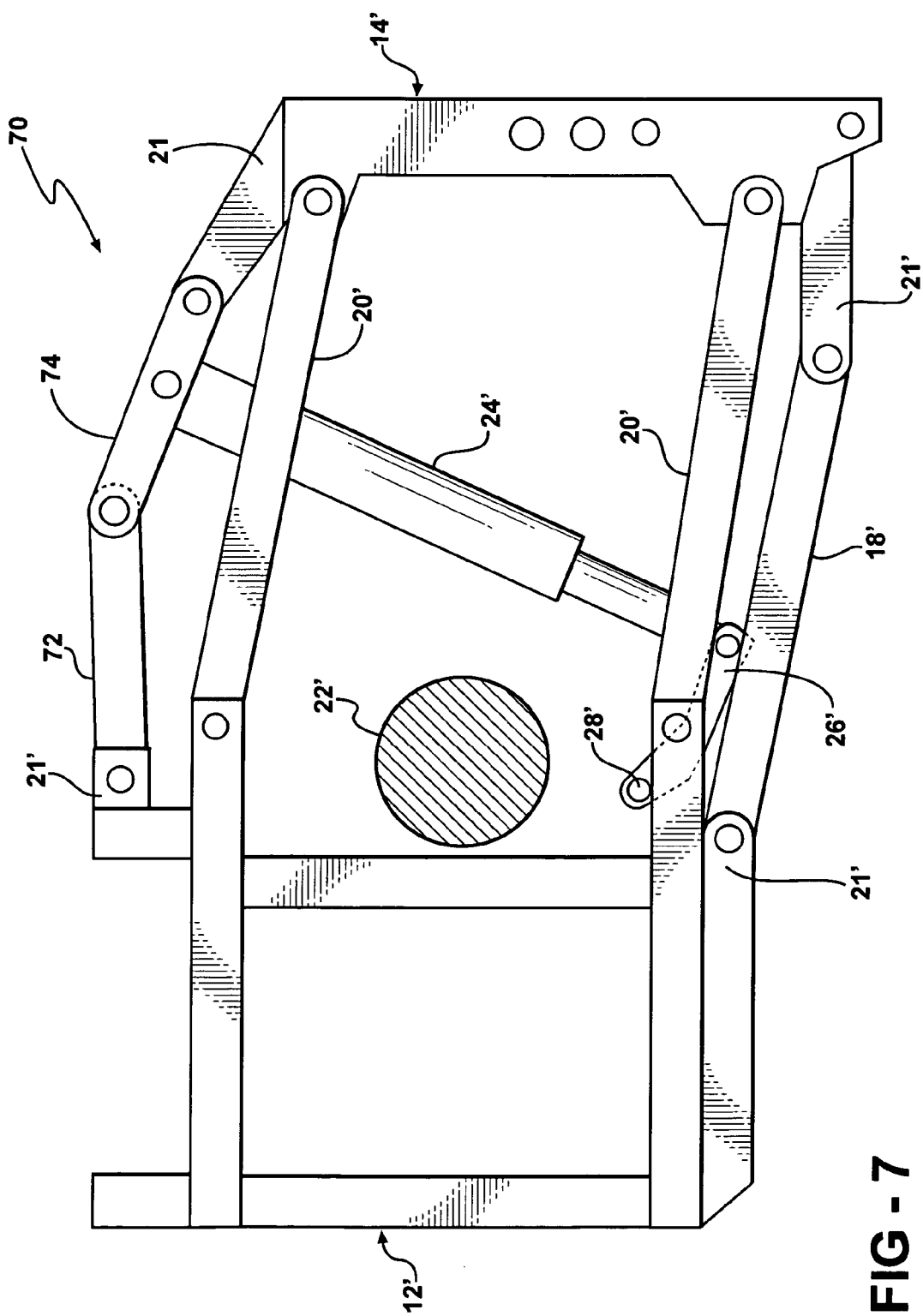
FIG. 7 is a side view partially in section of a towing mechanism according to another embodiment of the invention.

FIG. 7 shows a towing mechanism 70 according to another embodiment of the invention. Like structure from FIGS. 1-4 includes the same reference numerals with a prime ' symbol. Unless otherwise described, the use and operation of the structure is the same a previously described. The linkage 16 of FIG. 1 is replaced with a two linkages 72, 74. A first end of the linkage 72 is pivotally connected to the mounting bracket 21' of the main frame 12' and a second end of the linkage 72 is pivotally connected to a first end of the linkage 74. A second end of the linkage 74 is pivotally connected to the mounting bracket 21' of the receiver frame 14'. It is understood that the total length of the linkages 72, 74 can be the same as or longer than the total length of the linkage 16 of FIG. 1. In the embodiment shown, the shock absorber 24' mounts to the linkage 74. However, it is understood that the shock absorber 24' can be connected to the linkage 72' if desired. An advantage of using the two linkages 72, 74 over the single linkage 16 is that a constant tension can be maintained on all of the pivotal connections of the linkages 18', 20', 72, and 74. The shock absorber 24' can be used to apply a force to and cause the pivotal connection between the linkages 72, 74 to pivot, thereby militating against bushing related clearance problems with the linkages 18', 20'. Additionally, this militates against a rocking motion of the main frame 12' of the towing mechanism 70.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A towing mechanism for linking a vehicle and a trailer, the towing mechanism comprising:
   a main frame having a front portion and a rear portion;
   a receiver frame, wherein said receiver frame is adapted for attachment to the vehicle and the main frame is adapted for attachment to the trailer;
   a first linkage interconnecting said main frame and said receiver frame to facilitate relative vertical movement and to militate against relative horizontal movement between said main frame and said receiver frame;
   a second linkage interconnecting said main frame and said receiver frame and offset from said first linkage at least one of vertically and horizontally in a front to back direction in respect of said main frame; and
   ground engaging means disposed on said main frame.

2. The towing mechanism according to claim 1, wherein said ground engaging means includes an axle adapted to receive ground engaging wheels thereon.

3. The towing mechanism according to claim 1, further comprising at least one stabilizer disposed between the one of said main frame and said receiver frame and the vehicle.

4. The towing mechanism according to claim 1, further comprising a shock absorber disposed between at least one of said first linkage and said second linkage and said main frame.

5. The towing mechanism according to claim 1, including two first linkages and two second linkages.

6. The towing mechanism according to claim 5, further comprising a shock absorber disposed between one of said first linkages and one of said second linkages.

7. The towing mechanism according to claim 1, further comprising a shock absorber disposed between said main frame and said receiver frame.

8. A towing mechanism for linking a vehicle and a trailer, the towing mechanism comprising:
   a main frame;
   a receiver frame, wherein said receiver frame is adapted for attachment to the vehicle and said main frame is adapted for attachment to the trailer;
   a plurality of first linkages interconnecting said main frame and said receiver frame to facilitate relative vertical movement and to militate against relative horizontal movement between said main frame and said receiver frame;
   a plurality of second linkages interconnecting said main frame and said receiver frame and offset from said first linkages at least one of vertically and horizontally;
   ground engaging means disposed on said main frame;
   at least one stabilizer disposed between the other of said main frame and said receiver frame and the vehicle; and
   a shock absorber disposed between any of said plurality of first linkages, said plurality of second linkages and said main frame.

9. The towing mechanism according to claim 8, wherein said ground engaging means includes an axle adapted to receive ground engaging wheels thereon.

10. The towing mechanism according to claim 8, a wherein said shock absorber is disposed between at least one of said first linkages and at least one of said second linkages.

11. The towing mechanism according to claim 8, further comprising a second shock absorber disposed between said main frame and said receiver frame.

12. A towing mechanism for linking a vehicle and a trailer, the towing mechanism comprising:
    a main frame having a front portion and a rear portion;
    a receiver frame, wherein said receiver frame is adapted for attachment to the vehicle and said main frame is adapted for attachment to the trailer;
    a first linkage interconnecting said main frame and said receiver frame to facilitate relative vertical movement and to militate against relative horizontal movement between said main frame and said receiver frame;
    a second linkage interconnecting said main frame and said receiver frame and offset from said first linkage at least one of vertically and horizontally;

an axle disposed on said main frame, said axle adapted to receive ground engaging wheels thereon;

at least one stabilizer disposed between said receiver frame and the vehicle; and a shock absorber disposed between any of said first linkage said second linkage and said main frame.

13. The towing mechanism according to claim 12, wherein said axle is a steering axle.

14. The towing mechanism according to claim 12, wherein said axle is a drive axle.

15. The towing mechanism according to claim 12, wherein said axle is a rubber suspension axle.

16. The towing mechanism according to claim 12, wherein said axle is an air ride axle.

17. The towing mechanism according to claim 12, wherein said axle is one of a leaf spring axle and a coil spring axle.

* * * * *